United States Patent Office 3,740,335
Patented June 19, 1973

3,740,335
FERRIMAGNETIC CERAMICS
Edward A. Weaver, Toledo, Ohio, assignor to Owens-Illinois, Inc., Toledo, Ohio
No Drawing. Filed Aug. 12, 1971, Ser. No. 171,344
The portion of the term of the patent subsequent to Sept. 26, 1989, has been disclaimed
Int. Cl. C04b 35/26
U.S. Cl. 252—62.59                                   8 Claims

ABSTRACT OF THE DISCLOSURE

Ferrimagnetic ceramic compositions based on the ternary oxide system, $Fe_2O_3$-$Li_2O$-$SiO_2$. wherein the predominant crystalline phase is lithium ferrite ($LiFe_5O_8$). Minor amounts of nucleating agents, such as ZnO, can also be added to the basic ternary system to further enhance the developmet and growth of ferrite crystals. The ceramic bodies prepared from the above oxide systems, according to the sintering method of this invention, have rapid switching times and squareness ratios which make highly favorable materials for the manufacture of computer memory cores, radio coils, pulse transformers and other assorted electronic devices designed to operate at microwave frequencies.

BACKGROUND OF THE INVENTION

This invention relates to simple ceramic compositions, methods for the preparation of ferrimagnetic ceramics from simple ceramic compositions and the ferrimagnetic ceramic articles themselves.

Ferrites are magnetic crystalline materials containing ions having permanent magnetic dipoles. These dipoles orient or arrange themselves in domains or localized regions in which all of the elementary dipoles are aligned in a common direction. The ferrites of this invention are generally classified as spinels, or more properly, inverse spinels of the type which can have the empirical formula, $MFe_2O_4$, where M can be $Fe^{2+}$, $Ni^{2+}$ and $$(Li_{.5}^{1+} + Fe_{.5}^{3+}).$$

The preparation of magnetic ceramic ferrites has in the past proven complex, time-consuming and quite expensive, with the principal technical difficulty being the reproduction of ferrites of like quality and properties.

Representative of the patent literature relevant to the ferrimagnetic ceramics and processes of this invention are: U.S. Pats. 3,093,588; 3,414,372; 3,370,011; 3,413,-228; 2,549,089, and 3,096,288.

My invention is the discovery of simple oxide systems which can be consistently processed into ferrimagnetic ceramic bodies of like quality and performance.

The ferrites prepared from the compositions and by the sintering processes of this invention have low saturation magnetization, small coercive force, good squareness ratio, and rapid switching times, which make them highly desirable materials for use in apparatus operating at microwave frequencies.

SUMMARY OF THE INVENTION

My invention is a ferrimagnetic ceramic composition having a coefficient of thermal expansion in the range of about 85 to $100 \times 10^{-7}/°$ C. and consisting essentially of in excess of 60 to about 96 parts by weight $Fe_2O_3$; about 2 to about 40 parts by weight $Li_2O$; and about 2 to about 40 parts by weight $SiO_2$. Compositions of this invention can also optionally contain from about 10 to about 20 parts by weight ZnO.

Also included in my invention is a process for the preparation of ferrimagnetic ceramics from batch materials of the above composition comprising initially forming such composition into a green body followed by firing the green composition at sintering temperatures for a minimum interval of about one hour.

In the preferred compositions and processes of this invention, the ingredients are present in the following approximate relative proportions:

| Ingredients: | Parts by weight |
|---|---|
| $Fe_2O_3$ | 64–79 |
| $Li_2O$ | 3–6 |
| $SiO_2$ | 2–16 |
| ZnO | 14–17 |

DESCRIPTION OF THE INVENTION INCLUDING PREFERRED EMBODIMENTS

Method of preparation (a) Ingredients.—The batch materials which serve as the source of the ingredients in the ferrimagnetic compositions of this invention can be oxides, carbonates, nitrates or metalo-organic compounds. Typical of such batch materials are the carbonates of lithium which readily decompose during heating at elevated temperatures to yield the corresponding oxide. All of the ingredients of the compositions of this invention are also readily available in a reagent form or can be generated from other precursor compounds which are themselves so available.

Of course, functionally insignificant amounts of other ingredients can be present as impurities in the batch materials provided, however, that their presence does not appreciably affect the growth or development of lithium ferrite crystals in the ceramic, or is otherwise disruptive of the magnetic, electrical or physical characteristics of the composition. The presence of soda or alumina in the batch has been reported to create problems in the preparation of glass-ceramic ferrites, due to the competitive reaction of these two materials and lithium oxide for the available iron oxides in the system, and, therefore, control over the inadvertent inclusion of such materials should be carefully monitored, U.S. Pat. 3,492,273 (issued to P.C. Schultz).

The ceramics of this invention are prepared by forming a green mass from the batch materials of such ingredients followed by the firing of the mass at sintering temperatures. The particle size and relative distribution of the batch materials in the unfired object can and often does affect the plasticity of the composition, green strength, density and amount of shrinkage upon firing; and, therefore, the relative particle size of each of the components of the various compositions of this invention must be adjusted accordingly.

The batch materials of this invention can have particle sizes ranging from about 5 to 10 microns for the finer materials (e.g. $FeO_3$ rouge) and from about 10 to 15 microns for the coarser materials (e.g. $SiO_2$ $Li_2CO_3$ and ZnO). The various batch materials of the compositions of this invention can be prepared by milling or grinding in mechanical mills or by hand grinding with a mortar and pestle, or, as in the case the $Fe_2O_3$, are available commercially in very fine powder grades.

The distribution of the ingredients within the composition is directly affected by the relative particle size of the powders; the finer materials tending to fill the interstices between the coarser particles, thus reducing the porosity of the composition and the degree of shrinkage upon firing.

W. D. Kingery has reported that, by having materials of several differing particle sizes in the batch, better packing of the ingredients is attainable, Kinery, W. D., "Introduction to Ceramics," Chapter 3, John Wiley & Sons, N.Y. (1960). Therefore, by carefully adjusting the particle sizes and relative proportions of ingredients in the compositions of this invention, the ceramics prepared therefrom can be tailored to meet the porosity requirements of an intended application.

(b) Process.—The ceramics of this invention can be prepared by first forming the batch materials into coherent objects followed by the firing of such objects at sintering temperatures. Coherent objects can be prepared from the finely ground or powdered batch materials by pressing either dry or slightly dampened batch materials under pressures in excess of 1000 p.s.i.; by extrusion techniques; by plastic forming; or by slip casting techniques.

In the preferred embodiments of this invention, the finely powdered batch materials are calcined or prefired (circa 800 to 900° C.) in a nonreducing atmosphere (e.g. air or oxygen rich) and then reground. This pre-treatment of the batch materials can be repeated until there has been substantially complete transformation of the batch materials to the ferrite form or merely as a means of achieving a greater degree of intimacy and homogeneity in the mix.

After the batch materials have been thoroughly ground, mixed and calcined (if at all), they can be formed into a coherent or green body by compacting a dry or slightly dampened mass of such materials in a mold. The compaction pressure ordinarily required to form the powdered materials into a coherent body will usually approach about 1000 pounds per square inch. This pressure will vary directly with the particle size of the various materials and the degree of moisture (if any) present in the composition. Compositions in which the batch materials are finely ground generally require less pressure to compress them into coherent objects than do those compositions prepared from coarser materials. Compaction of the powdered materials can be increased with increasing compression pressure, the density curve flattening out at about 10,000 pounds per square inch. Compression at pressures in excess of 10,000 p.s.i. results in little, if any, additional densification of these powdered batch materials.

Once the batch materials have been formed into a coherent green mass, they are fired for an interval of at least one hour in a nonreducing atmosphere at the respective sintering temperatures for the particular compositions. The minimum interval required to sinter such compositions usually approximates one hour. Firing the green mass in excess of 24 hours produces little, if any, additional crystallization, with the firing intervals of about 5 to 12 hours sufficing for most of the compositions of this invention. Sintering temperatures for the compositions of this invention generally range from about 1000 to about 1150° C. Firing at temperatures in excess of sintering temperatures can, in some instances, adversely affect both the physical, magnetic and dielectric properties of the compositions of this invention. This is confirmed by the fact that ferrimagnetic materials cannot generally be satisfactorily prepared by glass-ceramic forming techniques from compositions having in excess of 60 parts by weight $Fe_2O_3$, since heating at the liquidus temperatures of such systems (in excess of 1400° C.) causes reduction of the ferric ions of the composition, thereby upsetting the delicat $Fe^{2+}/Fe^{3+}$ ratio with resultant drastic alteration of the magnetic and physical properties of the ferrite.

In the preferred process of this invention, the compacted batch materials should be fired in an air, oxygen-rich or pure oxygen environment in order to minimize reduction of ferric ions. Firing the green mass results in the spontaneous development and growth of lithium ferrite crystals throughout the green mass. Evidently, firing in an oxidizing atmosphere, in addition to the maintenance of the delicate ionic balance of the system, also facilitates the development and growth of ferrite crystals throughout the ceramic.

Firing also results in the further densification of the green mass as manifested by a reduction in porosity accompanied by shrinkages ranging anywhere from 10 to 40 percent, depending upon the original density of the green mass, and its $Fe_2O_3$ content. Ordinarily, those compositions having the greater $Fe_2O_3$ content will undergo a greater degree of shrinkage, due to crystallization of the ferric oxide to the ferrite.

Once having been fired, the composition is allowed to cool at room temperature. In order to optimize the development and growth of lithium ferrite in the ceramic, the composition may be reheated at temperatures ranging from 700° to 1000° C., depending upon $Fe_2O_3$ content, for an interval of about one to 16 hours. This heat-treatment of the ceramic, after firing, can result in a slight shift in density of the ceramic. The most effective use of post sintering heat-treatment occurs in those compositions having from 60 to 70 weight percent $Fe_2O_3$ and only at higher temperatures (circa 900 to 1000° C.).

After the ferrimagnetic ceramic has been prepared, it can be used directly in any one of the previously disclosed potential areas of application, or it can be machined or worked by standard techniques until its physical size and shape comply with predetermined dimensional specifications.

PHYSICAL, DIELECTRIC AND MAGNETIC PROPERTIES

Physical properties

The ferrite crystal structure of these compositions was studier by X-ray analysis and with the aid of an optical and electron microscope. X-ray diffractograms were made on powdered specimens with a Siemens X-ray diffractometer, using copper $K\alpha$ radiation and a nickel filter for the diffracted beam. Optical and electron microscope specimens were prepared by polishing the surface of the samples to be examined with a fine abrasive.

Optical photomicrographs, taken at magnification of 500× of the spontaneously crystallized samples of the composition of this invention reveal high concentrations of prismatic crystalline material. The distribution of crystalline material throughout the ceramic appears relatively uniform; however, because of the large crystal volume, other types of crystals were not readily identifiable. The volume of crystalline material in samples prepared from compositions of this invention ranged from a low of about 46 percent for the samples containing 60 parts by weight $Fe_2O_3$ to about 98 percent for samples having 90 parts by weight $Fe_2O_3$.

Mossbauer spectrophotometric analysis of several of the samples of the composition of this invention confirmed that the predominant crystalline phase of these compositions is lithium ferrite and that there is little $Fe^{2+}$ present in the samples X-ray diffraction patterns of the crystalline ferrite composition of this invention were also made. The lattice parameters of the crystals in the samples measured were somewhat smaller than those reported in the literature, M, Shieber, J. Inorg. Nuc .Chem., 26, 1363 (1964) and may indicate some substitution of $Fe^{3+}$ by $Si^{4+}$ in the tetrahedral sites of the $LiFe_5O_8$. Any substitution by $Si^{4+}$ in $LiFe_5O_8$ would tend to give smaller lattice parameters and have the effect of lowering the electrical resistivity of the crystalline ferrite.

The relative densities of the ceramics of this invention, both before and after heat-treatment, were calculated. Sintered ceramic products of this invention can have densities ranging from about 3.0 gms./cc. to near theoretical values depending upon the $Fe_2O_3$ content of the particular composition, the relative particle size of the various ingredients, the relative distribution of such ingredients in the unfired or green article, and the compression pressures employed in the formation of the green article. For example, ceramic bodies prepared from ternary oxide and nucleated systems of this invention have densities ranging from about 3.5 to 4.25 when initially formed into green bodies at compression pressures of 2000 to 3000 p.s.i.; those compositions having the higher $Fe_2O_3$ content having correspondingly greater densities.

Post-heating of samples to further induce crystallization caused only minor increases in density in some of the samples of lower $Fe_2O_3$ content while those samples having in excess of about 75 to 96 parts by weight remained substantially unaffected.

Because anomalies are known to occur in thermal expansion for some ferroelectric materials at the Curie temperature, thermal expansion measurements were made on a representative sampling of the compositions of this invention with a quartz tube dilatometer over a temperature range of 0 to 800° C. Linear thermal expansion measurements were also made for these same materials over a temperature range of 0 to 300° C.

At a temperature of about 650° C., samples containing about 90 parts by weight $Fe_2O_3$ begin to reveal a slight change in their expansion slope, with a definite rapid increase in expansion occurring between 745 and 761° C. These temperatures correspond to the Curie temperatures for this material and indicate order-disorder transition.

This order-disorder transition was also noted for all of the other compositions of this invention having in excess of 75 parts by weight $Fe_2O_3$. This invention or transformation, however, was seen to shift slightly towards lower temperatures with decreasing $Fe_2O_3$ content. In other words, the thermal hystersis curve became more skewed with decreasing $Fe_2O_3$ contact.

Coefficients of thermal expansion for the ceramics of this invention generally ranged from 85 to $100 \times ^{-7}/°$ C. (over a range of 0 to 300° C.) with no readily discernable correlation between composition and such coefficients.

Magnetic properties

Magnetic measurements were made on a representative number of samples of the compositions of this invention in order to evaluate the effect the relative concentration of ingredients and thermal history have on such properties The field strength (H) and induction (B) of the various samples were determined by placing the sample in a 1000 oersted cyclicly alternating applied field electromagnet and measuring the current induced on a Scientific-Atlanta Model 651B B-H meter. The values which are of primary concern with respect to the compositions of this invention are the maximum magnetic inductions ($B_m$), the residual flux, or remanence, ($B_r$) and coercivity ($H_c$).

The maximum magnetic induction ($B_m$) at an applied field of 1000 oersteds, appears to vary directly with $Fe_2O_3$ content of the sample, ranging from about 1800 gauss for ceramics having 60 parts by weight $Fe_2O_3$ to about 3600 gauss for those samples having a $Fe_2O_3$ content of 96 parts by weight. Heat-treating of the samples subsequent to sintering appears to have little effect on their magnetic induction.

The residual flux, or remanence, ($B_r$), also appears to be a function of compositional integrity. Residual fluxes for the ceramic compositions of this invention vary from about 175 to 600 gauss over the range of possible $Fe_2O_3$ concentration. Here, as before, the thermal history, more notably heat-treating, had little, if any, effect on such values.

The coercive force ($H_c$), (that force which is generally defined as the reverse field force which is necessary to reduce the intensity of the residual magnetization of a material to zero also appears to be a function of $Fe_2O_3$ content), ranged from 3 to 11 oersteds; the higher value corresponding to those compositions of greater $Fe_2O_3$ content. Schultz has shown that there is a direct correlation between coercivity and particle size, P. C. Schultz, "A Study of the Growth of Lithium Ferrites From a Silicate Glass," Ph.D. thesis, Rutgers University, 1967. Coercivities of 3 to 11 oersteds would tend to indicate that the individual crystals in the ceramic composition of this invention range in size from 2 to 8 microns.

Dielectric properties

The dielectric properties of ceramic ferrites were next considered, due to the effect such properties can have in defining or limiting the ultimate utility of the particular ferrite.

The electrical resistance of the various ferrites of this invention are believed to be critically dependent upon the relative proportions of ingredients in the particular composition, the $Fe^{2+}/Fe^{3+}$ ratio and crystal environment, in order of decreasing importance.

Furthermore, the addition of nucleating agents, such as ZnO, can sharply increase the AC resistivity of the particular composition even further, by ionizing to form $Zn^{2+}$ which, in turn, can then become substituted into the ferrite crystal lattice. This is especially true of those compositions which are subsequently heat-treated after sintering.

It is generally acknowledged that dielectric materials which have low AC resistivities generally prove to have high dielectric loss. Lithium ferrite-silica systems characteristically have demonstrated low AC resistivities, $pac \simeq 10^4$, which implies large dissipation factors (dielectric loss, $\tan \simeq 70$ percent at 0.5 mHz.).

This characteristic is thought to be due, in part, to interfacial polarization within the ceramic; that is, the separation of low resistivity crystals (ferrite)) by a thin layer of high resistance material (glass formers). This type of crystal environment amplifies the dielectric loss of such material by superimposing a dispersion into the dielectric loss spectrum for a given material.

One can conclude from evaluation of the dielectric properties of various samples of ceramic ferrite of this invention, that the addition of $Si^{4+}$ (in the form of $SiO_2$) and $Zn^{2+}$ (in the form of ZnO) in such ceramic systems generally tends to reduce AC resistivity, and that post sintering generally facilitated the substitution of $Si^{4+}$ and $Zn^{2+}$ into the ferrite crystal lattice increasing AC resistivity.

Attempts to correlate the magnetic loss with the initial permeability for the materials of this invention tended to confirm that post sintering heat-treatment of the compositions results in the formation of mixed ($Zn^{2+}$ substituted) ferrites and that $Si^{4+}$ is in all probability substituting into the tetrahedral sites of these compositions increasing electrical (AC) resistivity and magnetic loss while decreasing initial permeability.

The examples which follow further illustrate the ceramic compositions and process of this invention. Parts and percentages were used in such examples and are by weight unless otherwise stipulated.

EXAMPLE I

Two hundred grams of a formulation comprising 64.10 parts by weight of an $Fe_2O_3$ rouge, 5.98 parts by weight $Li_2O$, 15.38 parts by weight $SiO_2$ (Cab-O-Sil, Cabot Corp., Boston, Mass.), and 9.01 parts by weight ZnO are mixed with sufficient water to form a thin paste. The paste is then dried at temperatures slightly in excess of 100° C. until substantially all free water is driven off. Following drying, the formulation is thoroughly ground in a mortar and pestle. The fine powder is calcined in air at temperatures ranging from about 800 to 900° C. for about one hour.

The calcined powder is reground in a motor and pestle, placed in a hand hydraulic press and compacted under a force of about 2500 to 3500 p.s.i. into cylinders 1.25 inches in diameter and 1.25 inches in length. The cylinders are sintered at a temperature of about 1000° C. for five hours in an oxidizing environment (air). The cylinder thus produced has magnetic properties which make it useful in the preparation of computer memory cores, pulse transformers, and assorted devices designed to operate at microwave frequencies.

EXAMPLE II

A ferrimagnetic cylinder 1.25 inches in diameter and 1.25 inches in length is prepared according to the procedure of Example I from a composition having the following ingredients in approximate relative proportions:

| Ingredients: | Parts |
|---|---|
| $Fe_2O_3$ | 67.74 |
| $Li_2O$ | 5.33 |
| $SiO_2$ | 11.60 |
| ZnO | 15.33 |

The cylinder thus produced has magnetic properties which make it useful in the preparation of computer memory cores, pulse transformers, and assorted devices designed to operate at microwave frequencies.

EXAMPLE III

A ferrimagnetic cylinder 1.25 inches in diameter and 1.25 inches in length is prepared according to the procedure of Example I from a composition having the following ingredients in the approximate relative proportions:

| Ingredients: | Parts |
|---|---|
| $Fe_2O_3$ | 71.36 |
| $Li_2O$ | 4.61 |
| $SiO_2$ | 7.95 |
| ZnO | 16.11 |

The cylinder thus produced has magnetic properties which make it useful in the preparation of computer memory cores, pulse transformers, and assorted devices designed to operate at microwave frequencies.

EXAMPLE IV

A ferrimagnetic cylinder 1.25 inches in diameter and 1.25 inches in length is prepared according to the procedure of Example I from a composition having the following ingredients in the approximate relative proportions:

| Ingredients: | Parts |
|---|---|
| $Fe_2O_3$ | 74.81 |
| $Li_2O$ | 4.16 |
| $SiO_2$ | 4.16 |
| ZnO | 16.87 |

The cylinder thus produced has magnetic properties which make it useful in the preparation of computer memory cores, pulse transformers, and assorted devices designed to operate at microwave frequencies.

EXAMPLE V

A ferrimagnetic cylinder 1.25 inches in diameter and 1.25 inches in length is prepared according to the procedure of Example I from a composition having the following ingredients in the approximate relative proportions:

| Ingredients: | Parts |
|---|---|
| $Fe_2O_3$ | 79.13 |
| $Li_2O$ | 2.97 |
| $SiO_2$ | 0 |
| ZnO | 17.90 |

The cylinder thus produced has magnetic properties which make it useful in the preparation of computer memory cores, pulse transformers, and assorted devices designed to operate at microwave frequencies.

What is claimed is:

1. A process for the preparation of a ferrimagnetic ceramic having a linear coefficient of thermal expansion in the range of about 85 to $100 \times 10^{-7}/°$ C. from an intimately mixed powdered composition consisting essentially of 64 to about 79 parts by weight $Fe_2O_3$; about 3 to about 6 parts by weight $Li_2O$; about 2 to about 16 parts by weight $SiO_2$, and about 14 to about 17 parts by weight of ZnO which comprises:
   (a) forming the intimately mixed powdered composition into a green body, and
   (b) firing the green body in an oxidizing environment, at sintering temperatures for an interval in excess of about one hour.

2. The process for the preparation of a ferrimagnetic ceramic as defined in claim 1, wherein the intimately mixed powered composition is formed into a green body by compression at pressures in excess of about 1000 p.s.i. and sintered at temperatures ranging from about 1000 to about 1150° C. for an interval in excess of about one hour to about 24 hours.

3. A sintered ferrimagnetic ceramic article having a linear coefficient of thermal expansion in the range of about 85 to $100 \times 10^{-7}/°$ C. consisting essentially of about 64 to about 79 parts by weight $Fe_2O_3$; about 3 to about 6 parts by weight $Li_2O$; about 2 to about 16 parts by weight $SiO_2$; and about 14 to about 17 parts by weight of ZnO.

4. The ferrimagnetic ceramic article as defined in claim 3, wherein the composition has the following ingredients in the approximate relative concentrations:

| Ingredients: | Parts by weight |
|---|---|
| $Fe_2O_3$ | 64.10 |
| $Li_2O$ | 5.98 |
| $SiO_2$ | 15.38 |
| ZnO | 14.53 |

5. The ferrimagnetic ceramic article as defined in claim 3, wherein the composition has the following ingredients in the approximate relative concentrations:

| Ingredients: | Parts by weight |
|---|---|
| $Fe_2O_3$ | 67.74 |
| $Li_2O$ | 5.33 |
| $SiO_2$ | 11.60 |
| ZnO | 15.33 |

6. The ferrimagnetic ceramic article as defined in claim 3, wherein the composition has the following ingredients in the approximate relative concentrations:

| Ingredients: | Parts by weight |
|---|---|
| $Fe_2O_3$ | 71.36 |
| $Li_2O$ | 4.61 |
| $SiO_2$ | 7.95 |
| ZnO | 16.11 |

7. The ferrimagnetic ceramic article as defined in claim 3, wherein the composition has the following ingredients in the approximate relative concentrations:

| Ingredients: | Parts by weight |
|---|---|
| $Fe_2O_3$ | 74.81 |
| $Li_2O$ | 4.16 |
| $SiO_2$ | 4.16 |
| ZnO | 16.87 |

8. The ferrimagnetic ceramic article as defined in claim 3, wherein the composition has the following ingredients in the approximate relative concentrations:

| Ingredients: | Parts by weight |
|---|---|
| $Fe_2O_3$ | 79.13 |
| $Li_2O$ | 2.97 |
| $SiO_2$ | 2.00 |
| ZnO | 15.90 |

References Cited

UNITED STATES PATENTS

| | | | |
|---|---|---|---|
| 3,609,084 | 9/1971 | Loye | 252—62.61 |
| 3,637,504 | 1/1972 | Schmid | 252—62.61 |
| 2,549,089 | 4/1951 | Hegyi | 252—62.61 |
| 3,093,588 | 6/1963 | Brown | 252—62.61 X |
| 3,096,288 | 7/1963 | Sarkauskas et al. | 252—62.61 X |
| 3,492,237 | 1/1970 | Schultz | 252—62.61 |

OSCAR R. VERTIZ, Primary Examiner

J. COOPER, Assistant Examiner

U.S. Cl. X.R.

252—62.61, 62.62